United States Patent Office 3,286,329
Patented Nov. 22, 1966

3,286,329
PROCESS FOR THE MANUFACTURE OF A GEAR
Masao Naruse, Musashino-shi, Tokyo, and Takehiko Kumasawa, Kurashiki-shi, Japan; said Kumasawa assignor to Shim-Mitsubishi Jukogyo Kabushiki, Tokyo, Japan
Filed Mar. 6, 1963, Ser. No. 263,273
Claims priority, application Japan, Mar. 12, 1962, 37/9,575
2 Claims. (Cl. 29—159.2)

Conventionally, in gears composed of a single material, the treatment for increasing the anti-abrasiveness and strength thereof, such as cementation, nitriding, hardening, etc., when conducted on one part of the gear, has affected the remaining parts of the gear with adverse results.

The present invention relates to a method for producing a gear which is resistant to such treatment, comprising an outer surface portion of a predetermined thickness defining successive tooth surfaces, tooth crests and bottom lands (hereinafter called "the outer shell"), an inner shell part adapted for engaging a shaft (hereinafter called "the shaft part") and an intermediate part enclosed by said outer shell and said shaft part (hereinafter called "middle part"), which parts are independently composed of different kinds of material, such as anti-abrasive material, light weight metal, plastic material and liquids, and each of which parts is adapted to its particular quality and physical property requirements.

In the gear according to the present invention, the outer shell and the shaft parts are processed separately and filler material is filled in the enclosed part there-between. Thus, the outer shell and the shaft space can be independently composed of different material and configuration suitable for their respective functions. Further, cementation, nitriding and hardening treatments on the tooth face are not necessary, so that the other parts will never be affected. Accordingly, if a light weight metal, such as aluminum, is used as a filler material, the weight of the gear may be lightened, and if a plastic, such as, gum of synthetic resin, is used, not only will vibration and noise be avoided but also shock forces will be damped. Moreover by sealing the side faces of the gear, it is possible to confine a liquid such as oil, glycerin, etc. therewithin.

The present invention also contemplates in the process of manufacture of the above gear, the utilizing of impulse energy, to deform a thin plate member of a predetermined thickness to the desired shape of the outer shell such as by the explosion of an explosive suspended in a liquid or by the discharge between opposed electrodes in a liquid. The outer shell is then concentrically arranged around the shaft part, and filler material is introduced into the space enclosed by said outer shell and said shaft part.

In the process of the present invention, since the outer shell is shaped by action of impulse energy directed onto the plate member, and the filler material is then introduced into the space enclosed by the outer shell and the shaft part, making all members integral, the outer shell, the shaft part and the middle part can be separately and respectively provided with such characteristic and properties as most suitable for each part, and at the same time, precise gears of good performance may be produced easily, quickly and at low cost.

As the plate member of a predetermined thickness is shaped by the action of impulse energy directed thereonto, it is possible to strictly conform the configuration of the plate member to the die, even in case of complicated configuration. Further, in the present process, the part of the plate member constituting the tooth surface is acted by the impulse energy, and the hardness of this part is raised by the effect of the impulse energy.

Accordingly, an object of the present invention is to provide a process for forming gear comprised of three parts as abovementioned, which can be easily produced and treated, and each part of which can be independently composed of different materials and configuration suitable for its respective function.

Another object of the present invention is to provide a process of manufacturing gears, by which gears of precision and yet superior performance are obtainable very easily and rapidly at low cost, regardless of the kind, tooth number and configuration of the gears.

Other objects, features and advantages of the present invention will become apparent from the following description as illustrated in the accompanying drawings in which.

Figure 1:
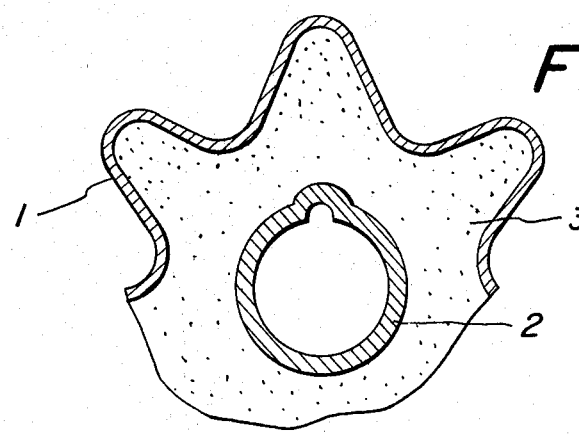
FIG. 1 is a vertical section of a spur gear manufactured according to the present invention.

In FIG. 1, there is shown a spur gear manufactured according to the present invention which comprises an outer shell 1 of cup shape and predetermined thickness, and defining successive tooth surfaces, tooth crests and bottom lands, a shaft part 2 of a predetermined thickness, with a key seat in the form of a recess, adapted for engaging a supporting shaft of the gear, and a middle part 3 enclosed by said outer shell 1 and the shaft part 2.

In the present invention, the outer shell 1 is press-shaped by impulse energy, as described below in detail. The shaft part 2 also may be press-shaped by impulse energy in a similar manner as the outer shell 1, but conventionally, it may be formed by a mechanical tooling process. The outer shell 1 and the shaft part 2 are arranged concentrically with each other and then a filler material of metal, synthetic resin or the like is filled in the enclosed space between the shell (1) and the part (2) thereby, thus forming an integral gear.

Figure 2:
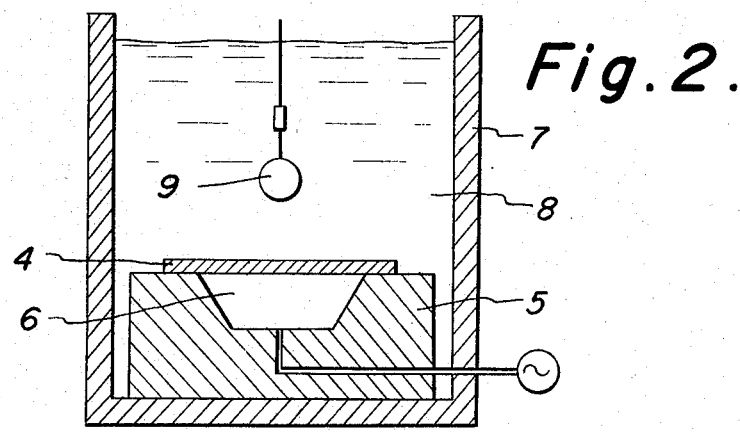
FIGS. 2, 3 and 4 are respectively cross sections of apparatus for shaping an outer shell of the gear employed in the present process.
Figure 3:
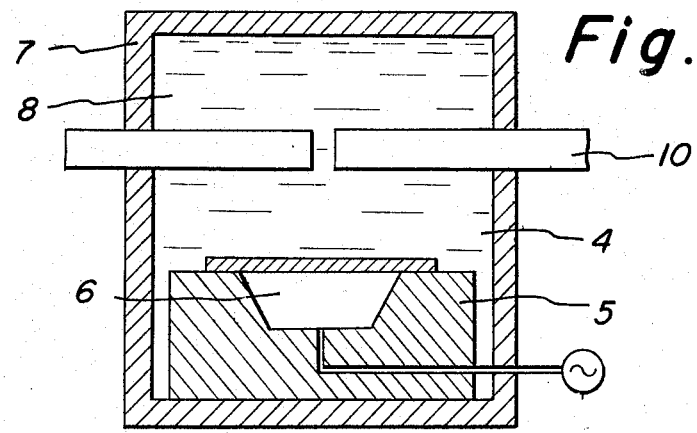
Figure 4:
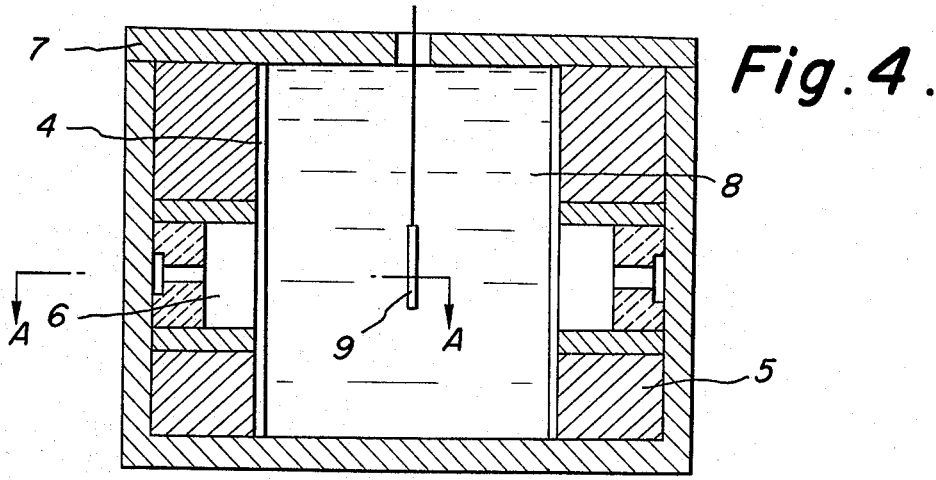

As shown in FIGS. 2, 3 and 4, in the formation of the outer shell 1, a recess 6 of a die 5 is covered in sealing relation therewith by a thin plate 4 suitable as the gear outer shell. The recess 6 is evacuated by a vacuum pump or the like, and the die and plate is immersed into a liquid 8 in a liquid tub 7. Then, as shown in FIGS. 2 and 4, an explosive 9 suspended in the liquid 8 is exploded, or as shown in FIG. 3, opposed electrodes 10 in the liquid 8 are discharged. Impulse energy generated by explosion of the explosive or by discharge between the electrodes is converted into liquid pressure and, acting on the the thin plate, causes it to be pressed against the die and conform to the shape thereof.

Figure 5:
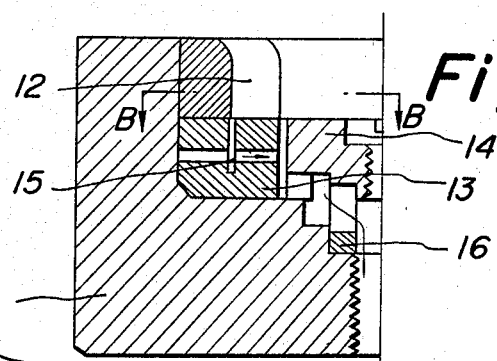
FIGS. 5 and 6 are respectively cross sections of a die used in the above equipment for shaping the outer shell of the gear.
Figure 7:
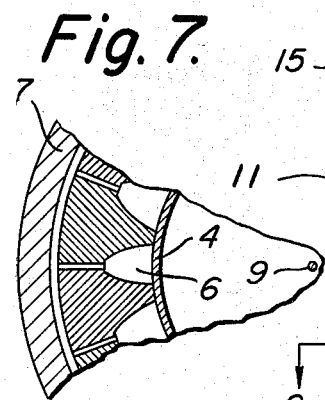
FIG. 7 is a cross-section taken along line A—A in FIG. 4.

Of course, the dies can be altered according to the tooth number, configuration and kind of gear to be manufactured. However, in the case of a spur gear as shown in FIGS. 2 and 3 a die such as that shown in FIG. 5 is used. In FIG. 5, 11 is a main die, 12 is a tooth die corresponding to the desired number of teeth and configuration, and carried on the main die 11. 13 and 14 are respectively a ring and a bottom shaping die, which are replaceable in accordance with the face width of the gear and on which air purge 15 is provided. 16 is an auxiliary ring.

Figure 6:
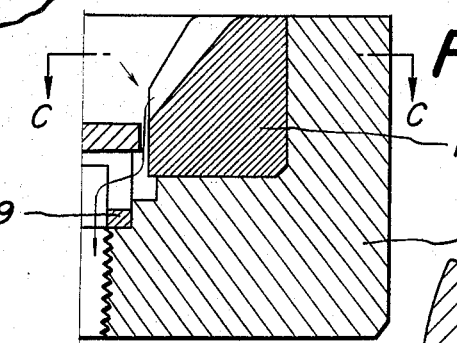
Figure 9:
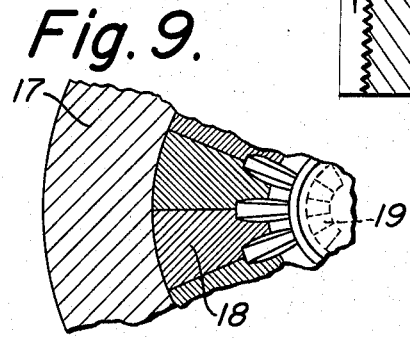
FIG. 9 is a cross-section taken along line C—C in FIG. 6.
Figure 8:
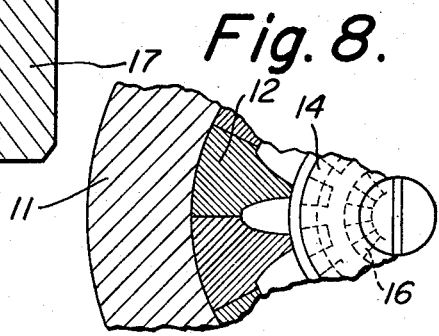
FIG. 8 is a cross-section taken along line B—B in FIG. 5.

In the manufacture of a bevel gear, a die such as that shown in FIG. 6 may be adopted. In FIG. 6, 17 is the main die, 18 is a tooth die selected according to face width, tooth number and configuration of a desired gear. 19 is an auxiliary ring.

If the apparatus of FIG. 4 is used in the manufacture of a spur gear, a die having an annular tooth die divisible to any number may be covered by a cylindrical thin plate member in sealing relation therewith.

Since the metal member is shaped by impulse energy which is discharged in an extremely short time, the impulse pressure is very high, and the elongation rate of machined metal member is high and elastic return slight.

Accordingly, in shaping metal by impulse energy, utilization of a precise die enables it to strictly conform to the die, even in the case of complicated configuration.

Further, by means of impulse energy, hard and anti-abrasive material, such as nickel, may be easily shaped as required.

Furthermore, in the impulse energy operation, the hardness of the part acted thereby will be further raised.

Consequently, in the present invention, since the outer shell is shaped by impulse energy, even in the case of complicated configuration, as in the case of a gear shell, precise, easy, and quick effects at low cost will result, and moreover, hard and anti-abrasive material, such as nickel and the like, may be utilized for the gear outer shell. Further, as the outer shell is hardened by impulse energy and the tooth surface part in particular is more hardened under the treatment, desirable properties and performance for a gear may be obtained, without a prior treatment of cementation, nitriding, hardening, etc.

In the present invention, since the outer shell and the shaft part are processed separately and filler material is filled in the enclosed part therebetween, making them integral, the outer shell and the shaft part can be independently composed of different material suitable for the respective parts. Further, as cementation, nitriding and hardening treatment on the tooth face are not necessary, the other parts will never be affected. Accordingly, if light metal, such as aluminum, is used as filler material, the weight of gear may be reduced, and if a plastic material, such as gum or synthetic resin, is used, not only will vibration and noise be avoided but also shock forces will be damped. Furthermore by sealing the side face of the gear, it is possible to use a liquid such as oil, glycerin, etc., as the filler material.

As above mentioned, in the present invention, since the outer shell is shaped by the action of impulse energy directly on the thin plate member, and the filler material is then introduced into the space enclosed by the outer shell and the shaft part, making all members integral, the outer shell, the shaft part and the middle part can be separately and respectively provided with such characteristics and properties as most suitable to each part, and at the same time, precise gears of good performance may be produced easily, quickly and at low cost.

There will now be obvious to those skilled in the art many modifications and variations of the method and construction set forth. These modifications and variations will not however depart from the scope of the invention as long as they lie within the bounds of the following claims.

What is claimed is:

1. A method of making a gear comprising forming a suitable hard and anti-abasive metal in the shape of a thin flat plate gear blank, explosively deforming said blank into the final form of an outer cup-shaped shell of a gear, assembling a shaft part in the center of said gear shell, and filling the portion enclosed by said gear shell and said shaft part with a lightweight material.

2. A method as claimed in claim 1 wherein said lightweight material is aluminum, a synthetic resin or a liquid.

References Cited by the Examiner
UNITED STATES PATENTS

| | | | |
|---|---|---|---|
| 820,789 | 5/1906 | Hutchins | 74—460 |
| 1,004,980 | 10/1911 | Broadfield | 74—460 |
| 1,393,886 | 10/1921 | Doty | 74—460 |
| 1,407,704 | 2/1922 | Morris | 29—159.2 |
| 1,908,187 | 11/1940 | Ross | 29—159.2 |
| 2,221,415 | 11/1940 | Short | 29—159.2 |
| 2,983,242 | 5/1962 | Cole | 72—56 |
| 3,057,313 | 10/1962 | Setter | 72—56 |
| 3,163,141 | 12/1964 | Wesley et al. | 72—56 |

JOHN F. CAMPBELL, *Primary Examiner.*

THOMAS H. EAGER, *Examiner.*